US012802900B2

(12) United States Patent
Strand et al.

(10) Patent No.: US 12,802,900 B2
(45) Date of Patent: Nov. 17, 2026

(54) ADAPTER FOR ELECTRIC SWITCH ASSEMBLY AND ELECTRIC SWITCH ASSEMBLY COMPRISING THE SAME

(71) Applicant: ABB Schweiz AG, Baden (CH)

(72) Inventors: Fredrik Strand, Vaasa (FI); Mikko Välivainio, Vaasa (FI); André Nordman, Vaasa (FI)

(73) Assignee: ABB SCHWEIZ AG, Baden (CH)

( * ) Notice: Subject to any disclaimer, the term of this patent is extended or adjusted under 35 U.S.C. 154(b) by 287 days.

(21) Appl. No.: 18/618,443

(22) Filed: Mar. 27, 2024

(65) Prior Publication Data

US 2024/0339269 A1 Oct. 10, 2024

(30) Foreign Application Priority Data

Apr. 6, 2023 (EP) .................................... 23167024

(51) Int. Cl.

*H01H 9/06* (2006.01)
*H01H 9/02* (2006.01)
*H01H 9/22* (2006.01)
*H01H 9/24* (2006.01)

(52) U.S. Cl.

CPC ............ *H01H 9/0264* (2013.01); *H01H 9/06* (2013.01); *H01H 9/22* (2013.01); *H01H 9/24* (2013.01)

(58) Field of Classification Search

CPC .. H01H 2071/565; H01H 9/22; H01H 9/0264; H01H 71/56; H01H 9/282; H01H 71/0228; H01H 9/281; H01H 19/04; H01H 19/06; H01H 19/24

See application file for complete search history.

(56) References Cited

U.S. PATENT DOCUMENTS 4,774,390 A * 9/1988 Lehman ............... H01H 9/0264 200/305
2016/0260560 A1* 9/2016 Mishra ................... H01H 71/52
2022/0285105 A1* 9/2022 Zhang .................... H01H 71/08

FOREIGN PATENT DOCUMENTS

DE 7501663 U 5/1975
EP 1000430 B1 9/2006
EP 3065153 A1 9/2016

OTHER PUBLICATIONS

European Search Report; Application No. 23167024.1; Issued: Sep. 18, 2023; 2 Pages.

* cited by examiner

*Primary Examiner* — Ahmed M Saeed
(74) *Attorney, Agent, or Firm* — Greenberg Traurig, LLP

(57) ABSTRACT

An adapter for an electric switch assembly, the adapter having an adapter body adapted to be immovably connected to an electric switch including a first set of terminals, wherein each of the terminals includes a terminal member adapted for releasing a connection between the terminal and the corresponding electric wire. The adapter includes a protective cover movably connected to the adapter body such that the protective cover has a protection position and a first installation position, wherein in the protection position the protective cover is adapted to prevent use of the terminal members of the electric switch, and in the first installation position the protective cover is adapted to enable use of terminal members of the first set of terminals, wherein said use of a terminal member includes releasing a connection between the terminal and the corresponding electric wire.

14 Claims, 3 Drawing Sheets

ADAPTER FOR ELECTRIC SWITCH ASSEMBLY AND ELECTRIC SWITCH ASSEMBLY COMPRISING THE SAME

TECHNICAL FIELD

The present invention relates to an adapter for an electric switch assembly.

BACKGROUND

FIG. 1*a* shows a known electric switch assembly in a disassembled state. The known electric switch assembly comprises an adapter and an electric switch 30'.

The adapter comprises an adapter body 2' adapted to be immovably connected to the electric switch 30', and an adapter handle member rotatably connected to the adapter body 2' and adapted to be connected to a control shaft 36' of the electric switch 30' in order to enable transferring the electric switch 30' between a connected state and disconnected state thereof by rotating the adapter handle member. The adapter handle member is covered with an operating handle 65' adapted to be manually operated by a user. The operating handle 65' is immovably connected relative to the adapter handle member.

The adapter body 2' is provided with a plurality of flexible snap-fit members adapted to co-operate with counterpart members provided on the electric switch 30'. The immovable connection between the adapter and the electric switch 30' is adapted to be realized by co-operation between the plurality of flexible snap-fit members and the counterpart members provided on the electric switch 30'.

The electric switch 30' comprises a first set 31' of terminals and a second set of terminals. The first set 31' of terminals and the second set of terminals are spaced apart in a height direction of the electric switch 30'. In FIGS. 1*a*-1*c*, the height direction of the electric switch 30' is a vertical direction, and the first set 31' of terminals is located in the upper portion of the electric switch 30'.

Both the first set 31' of terminals and the second set of terminals comprises three terminals. Each terminal of the first set 31' of terminals and second set of terminals is adapted to be electrically conductively connected to a corresponding electric wire. Each terminal comprises a terminal screw adapted for electrically conductively connecting the terminal to the corresponding electric wire. Screw-heads of the terminal screws are accessible through apertures 303' on a front surface of the electric switch 30'.

In the connected state, or ON state of the electric switch 30', each terminal of the first set 31' of terminals is electrically conductively connected to a corresponding terminal of the second set of terminals. In the disconnected state, or OFF state of the electric switch 30', the first set 31' of terminals is electrically isolated from the second set of terminals.

FIG. 1*b* shows the known electric switch assembly in an assembled state in which the adapter body 2' is immovably connected to the electric switch 30'. The electric switch 30' is mounted on an installation rail 101', which is a standardized installation rail complying with DIN standard.

In the assembled state of the known electric switch assembly, the adapter body 2' blocks access to the screw-heads of the terminal screws. Therefore, connecting electric wires to the terminals of the electric switch 30', and disconnecting electric wires from the terminals of the electric switch 30' requires separating the adapter from the electric switch 30'.

FIG. 1*c* shows the known electric switch assembly of FIG. 1*b* with a protection plate 707'. The protection plate 707' is parallel with the installation rail 101' and spaced apart from it in a depth direction.

The protection plate 707' has a protection plate opening 788' through which a portion of the adapter body 2' extends such that the operating handle 65' is located on a first side of the protection plate 707' while the terminals of the electric switch 30' are located on a second side of the protection plate 707'.

The protection plate 707' is a standardized protection plate complying with DIN standard. A height of the protection plate opening 788' is 46 mm. A height of the portion of the adapter body 2' extending through the protection plate opening 788' is 45 mm, so the portion of the adapter body 2' practically covers the protection plate opening 788' in the height direction. Without the adapter, the terminal members of the electric switch 30' would be accessible through the protection plate opening 788', which would violate safety regulations. Consequently, the adapter is required for complying with safety regulations.

One of the problems associated with the above known electric switch assembly is that the requirement to separate the adapter from the electric switch 30' for accessing the screw-heads of the terminal screws increases time needed for connecting electric wires to and disconnecting electric wires from the electric switch 30'. Further, there is a risk that the adapter gets lost in connection with connecting or disconnecting electric wires. Also, there is a risk that the adapter breaks or is poorly re-installed on the electric switch 30'.

SUMMARY

An object of the present invention is to provide an adapter for an electric switch assembly and an electric switch assembly comprising the adapter so as to solve the above problems. The objects of the invention are achieved by an adapter for an electric switch assembly and an electric switch assembly described in the following.

The invention is based on the idea of providing an adapter for an electric switch assembly with a protective cover movably connected to an adapter body such that the protective cover has a protection position and a first installation position relative to the adapter body, wherein in the protection position the protective cover is adapted to prevent use of terminal members of the electric switch, and in the first installation position the protective cover is adapted to enable use of terminal members of a first set of terminals, wherein said use of a terminal member comprises releasing a connection between the terminal and the corresponding electric wire.

An advantage of the adapter of the invention is that terminal members of the first set of terminals can be used without separating the adapter from the electric switch.

In an embodiment the protective cover is slidably connected to the adapter body such that sliding direction of the protective cover in an assembled electric switch assembly is adapted to be parallel to the height direction of the protection plate opening. Consequently, there is no need to provide the adapter with locking means for locking the protective cover in the protection position. Instead, edges of the protection plate opening inherently prevent the protective cover from moving away from the protection position.

BRIEF DESCRIPTION OF THE DRAWINGS

In the following the invention will be described in greater detail by means of preferred embodiments with reference to the attached drawings, in which.

DETAILED DESCRIPTION

Figure 2:
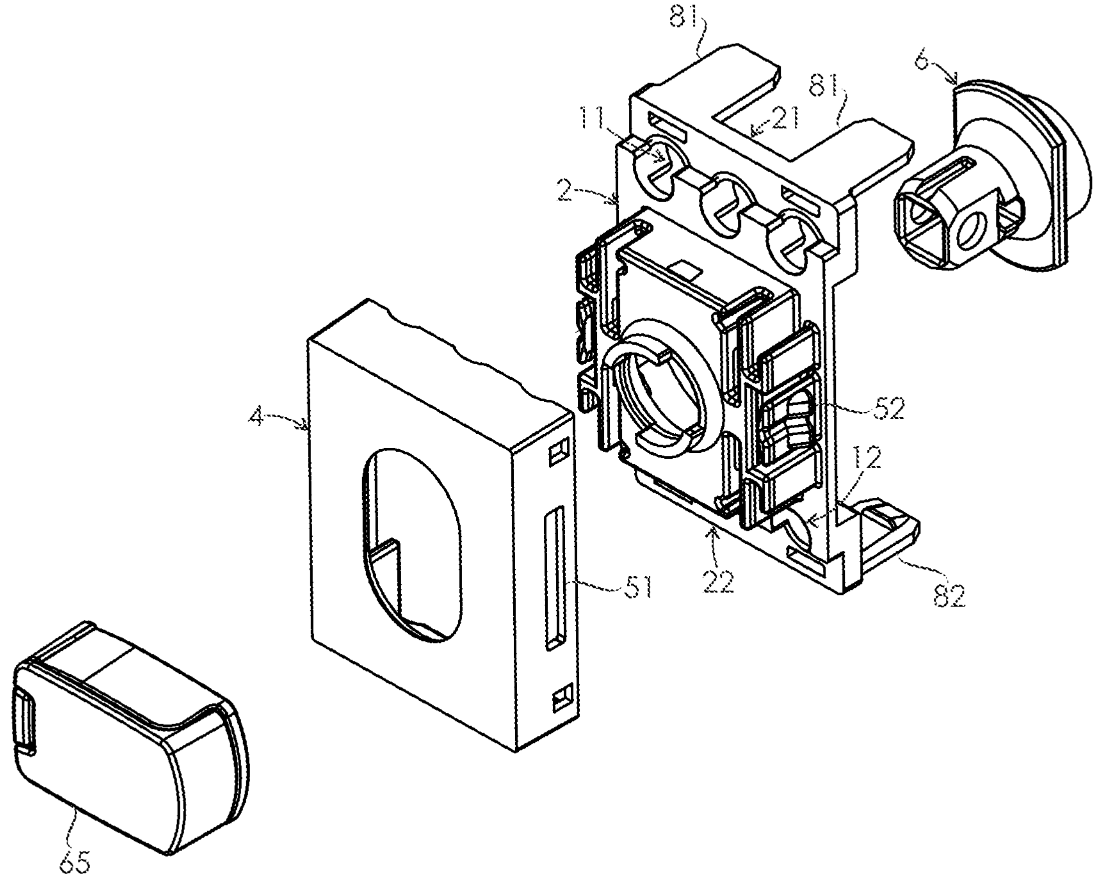
FIG. 2 shows an exploded view of an adapter for an electric switch assembly according to an embodiment of present invention.
Figure 3:
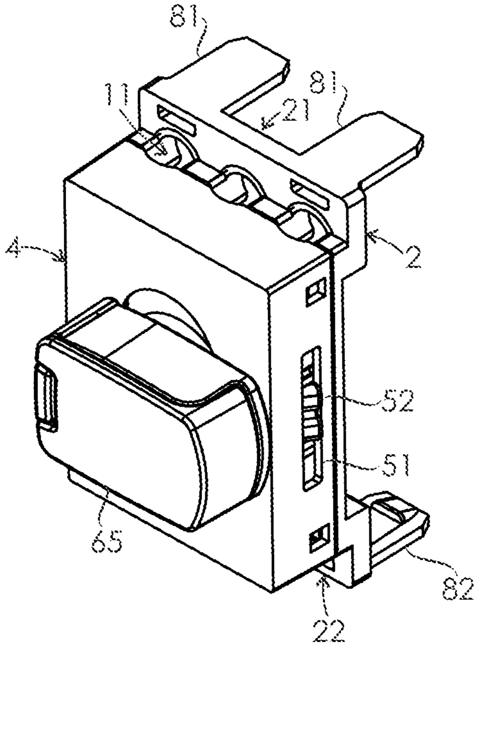
FIG. 3 shows the adapter of FIG. 2 in an assembled state.

FIG. 2 shows an exploded view of an adapter for an electric switch assembly. The adapter comprises an adapter body 2, a protective cover 4, an adapter handle member 6 and an operating handle 65. FIG. 3 shows the adapter of FIG. 2 in an assembled state.

Figure 1A:
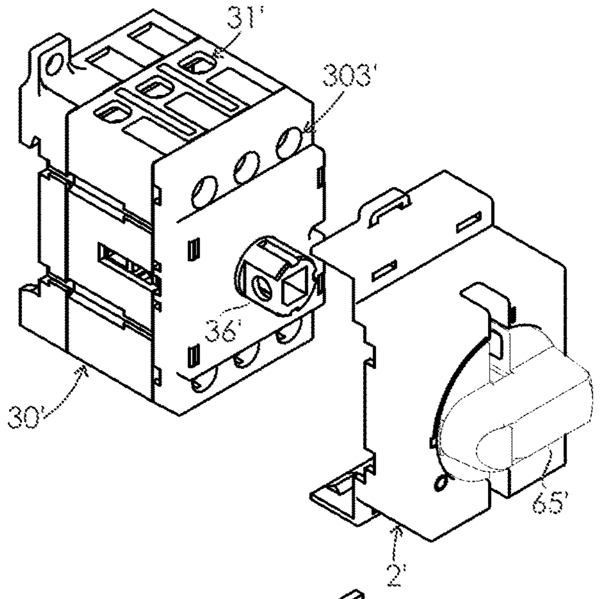
FIG. 1*a* shows components of a known electric switch assembly.
Figure 1B:
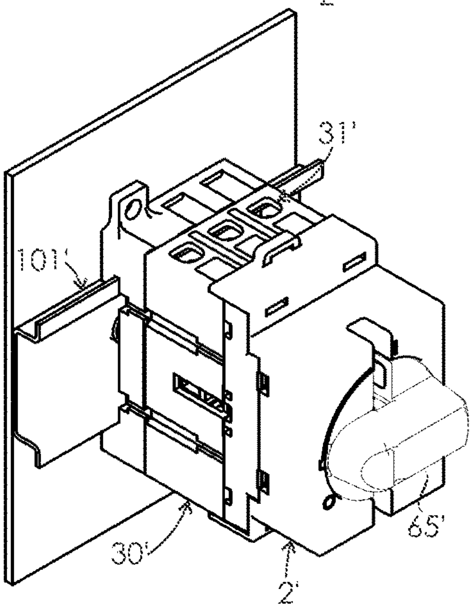
FIG. 1*b* shows the known electric switch assembly consisting of components shown in FIG. 1*a* and mounted on an installation rail.
Figure 1C:
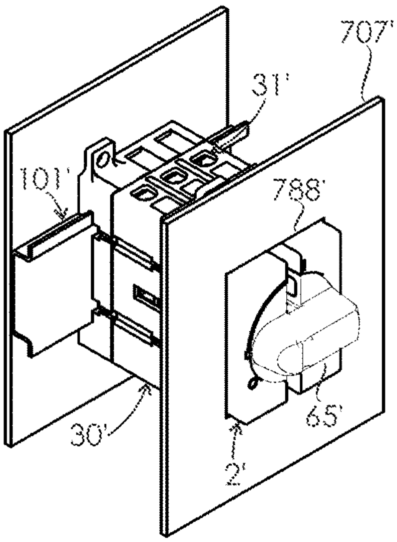
FIG. 1*c* shows the known electric switch assembly of FIG. 1*b* with a protection plate.

The adapter body 2 is adapted to be immovably connected to an electric switch comprising a first set of terminals, wherein each of the terminals of the first set of terminals is adapted to be electrically conductively connected to a corresponding electric wire, and comprises a terminal member adapted for releasing a connection between the terminal and the corresponding electric wire. Practically, the adapter body 2 is adapted to be immovably connected to an electric switch similar to the electric switch shown in FIGS. 1*a*-1*c*.

The adapter body 2 comprises a first set 11 of apertures and a second set 12 of apertures extending through the adapter body 2 in a depth direction. The first set 11 of apertures and the second set 12 of apertures are spaced apart in a height direction of the adapter body 2, and adapted to provide access to terminal members of the electric switch when the adapter body 2 is in a connected state relative to the electric switch.

The adapter body 2 is adapted to be immovably connected to the electric switch by means of snap-fitting. The adapter body 2 is provided with four flexible snap-fit members adapted to co-operate with counterpart members provided on the electric switch. There are two first snap-fit members 81 on a first side 21 of the adapter body 2, and two second snap-fit members 82 on a second side 22 of the adapter body 2, wherein the first side 21 and the second side 22 are spaced apart in the height direction. Snap-fitting as such is well-known in the art, and it is not discussed in detail herein.

The protective cover 4 is adapted to be movably connected to the adapter body 2 such that the protective cover 4 has a protection position, a first installation position and a second installation position relative to the adapter body 2. Herein, the movable connection between the protective cover and the adapter body means a connection which allows movement between the protection position, the first installation position and the second installation position while being able to keep the protective cover and the adapter body together in all positions of the adapter.

The protective cover 4 is adapted to move in the height direction relative to the adapter body 2. Therefore, the protection position and the first installation position are spaced apart in the height direction. Further, the protection position and the second installation position are spaced apart in the height direction such that the protection position is a centre position of the protective cover 4.

The protective cover 4 comprises two grooves 51 located on opposite sides of the protective cover 4 in the width direction. Each of the grooves 51 extend in the height direction. The adapter body 2 comprises two protrusions 52 each adapted to co-operate with a corresponding groove 51 in order to enable the movable connection between the protective cover 4 and the adapter body 2 while keeping the protective cover 4 and the adapter body 2 together. A dimension of the protective cover 4 in the height direction is 45 mm.

In an alternative embodiment, one of the protective cover and the adapter body comprises at least one groove, and the other of the protective cover and the adapter body comprises at least one protrusion adapted to co-operate with the at least one groove in order to enable the movable connection between the protective cover and the adapter body while keeping the protective cover and the adapter body together. The at least one groove and the at least one protrusion are adapted to provide a slidable connection between the protective cover and the adapter body such that sliding direction of the protective cover is parallel to the height direction.

The adapter handle member 6 is movably connected to the adapter body 2 such that the adapter handle member 6 has a first position and a second position relative to the adapter body 2. The adapter handle member 6 is movable relative to the protective cover 4. The adapter handle member 6 is adapted to be connected to a control member of the electric switch in order to enable transferring the electric switch between a connected state and disconnected state thereof by moving the adapter handle member 6.

The adapter handle member 6 is rotatably connected to the adapter body 2, and the adapter handle member 6 is adapted to be connected to a control shaft of the electric switch in order to enable transferring the electric switch between a connected state and disconnected state thereof by rotating the adapter handle member 6.

In an alternative embodiment, the adapter body is adapted to be immovably connected to an electric switch whose control member is linearly movable relative to a frame of the electric switch. In this embodiment, the adapter handle member is linearly movably connected to the adapter body, and the adapter handle member is adapted to be connected to control member of the electric switch in order to enable transferring the electric switch between a connected state and disconnected state thereof by linearly moving the adapter handle member.

The operating handle 65 is adapted to be immovably connected relative to the adapter handle member 6 such that the adapter handle member 6 is covered with the operating handle 65 adapted to be manually operated by a user.

In an alternative embodiment, the adapter handle member is adapted to be manually operated by a user, and a separate operating handle is omitted. In further alternative embodiments, the adapter does not comprise any adapter handle member. In one of said further alternative embodiments, the adapter body is adapted to be immovably connected to an electric switch such that the control member of the electric switch is accessible by a user, and the user can transfer the electric switch between a connected state and disconnected state thereof by gripping the control member. In another of said further alternative embodiments, the adapter body is adapted to be immovably connected to an electric switch which is adapted to be remotely electrically connected and has no control member.

The adapter handle member 6 is adapted to be padlocked in the first position relative to the adapter body 2, wherein the first position of the adapter handle member 6 corresponds to the disconnected state of the electric switch. This feature as such is well known in the art, and it is not discussed in detail herein.

Figure 4A:
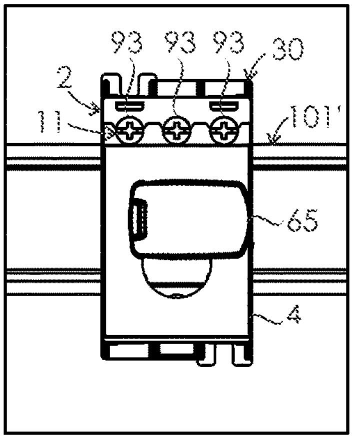
FIGS. 4*a*-4*c* illustrate different positions of a protective cover in an electric switch assembly comprising the adapter of FIG. 3, an electric switch, and an installation rail.
Figure 4B:
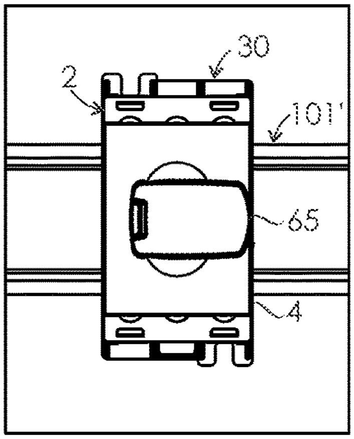
Figure 4C:
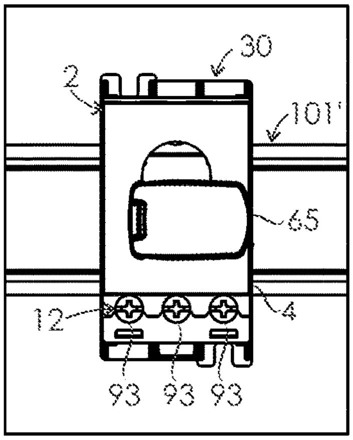

FIGS. 4*a*-4*c* illustrate different positions of the protective cover 4 in an electric switch assembly comprising the adapter of FIG. 3, an electric switch 30, and the installation rail 101'. The installation rail 101' in FIGS. 4*a*-4*c* is identical to the one shown in FIGS. 1*b* and 1*c*. The electric switch 30 has all the same features as the electric switch 30', and the features are denoted with similar reference numbers. There are some differences between designs of the electric switches 30' and 30, but those differences are not significant for functionality of the switches.

In FIGS. 4*a*-4*c*, the adapter is immovably connected to the electric switch 30, and the electric switch 30 is mounted on the installation rail 101'. FIG. 4*a* shows the first installation position, FIG. 4*b* shows the protection position, and FIG. 4*c* shows the second installation position. FIGS. 4*a* and 4*c* show that each terminal member 93 comprises a terminal screw.

FIGS. 4*a*-4*c* show the electric switch assembly from a direction parallel to the depth direction. Therefore, in FIGS. 4*a*-4*c*, the height direction is a vertical direction, the depth direction is a direction perpendicular to the image plane, and a width direction is a horizontal direction.

In the first installation position shown in FIG. 4*a*, the protective cover 4 is adapted to enable use of terminal members 93 of a first set 31 of terminals, and to prevent use of terminal members of the second set of terminals. FIG. 4*a* shows that the terminal members 93 of the first set 31 of terminals are fully accessible while the terminal members of the second set of terminals are fully covered such that on a plane perpendicular to the depth direction, a projection of the protective cover 4 fully covers projections of the terminal members of the second set of terminals.

Herein, use of a terminal member comprises releasing a connection between the terminal corresponding to the terminal member and an electric wire connected to the terminal. Since in the electric switch 30 the terminal members are terminal screws, use of any of the terminal members requires appropriate access to the screw-head of the terminal screw by a screwdriver.

In the protection position shown in FIG. 4*b*, the protective cover 4 is adapted to prevent use of the terminal members of the first set 31 of terminals and the second set of terminals. However, the terminal members of the first set 31 of terminals and the second set of terminals are not fully covered by the protective cover 4. In the protection position, the protective cover 4 covers a majority of cross-sectional areas of the first set 11 of apertures and second set 12 of apertures, and in the first installation position the protective cover 4 covers less the cross-sectional area of the first set 11 of apertures than in the protection position.

In the protection position, the protective cover 4 is adapted to enable a voltage measurement from the first set 31 of terminals and the second set of terminals. In other words, the terminal members of the first set 31 of terminals and the second set of terminals are partly accessible in order to allow pushing a voltage probe into contact with the terminal members.

In an embodiment, the adapter body and the protective cover are designed such that in the protection position, the protective cover is adapted to cover at least 75% of cross-sectional areas of the first set of apertures and second set of apertures, and in the first installation position the protective cover is adapted to cover less than 10% of cross-sectional area of the first set of apertures. In another embodiment, the adapter body and the protective cover are designed such that in the protection position, the protective cover is adapted to fully cover the terminal members of the first set of terminals and the second set of terminals. Referring to FIGS. 4*a*-4*c*, said functionality could be achieved by increasing dimension of the protective cover 4 in the height direction, and increasing distance between the first installation position and the second installation position in the height direction.

In the second installation position shown in FIG. 4*c*, the protective cover 4 is adapted to enable use of terminal members 93 of the second set of terminals, and to prevent use of terminal members of the first set 31 of terminals. FIG. 4*c* shows that the terminal members 93 of the second set of terminals are fully accessible while the terminal members of the first set 31 of terminals are fully covered. In the second installation position, the protective cover 4 covers less the cross-sectional area of the second set 12 of apertures than in the protection position.

In an alternative embodiment, each terminal member comprises a quick wire connector (not shown). In this alternative embodiment, releasing a connection between a terminal member and a corresponding electric wire is adapted to be realized by pushing the terminal member by a tool in the depth direction. Establishing an electrically conductive connection between the terminal member and the corresponding electric wire is adapted to be realized by pushing the electric wire into the terminal member in the height direction.

Figure 5A:
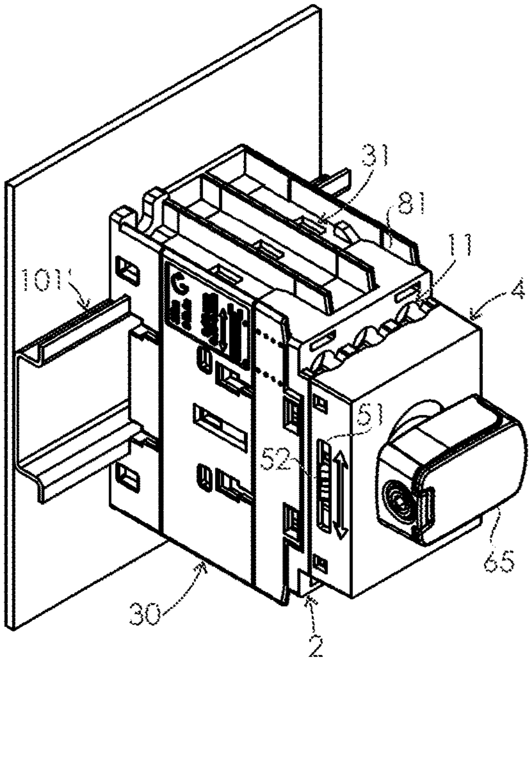
FIG. 5*a* shows the electric switch assembly of FIG. 4*b* from a different direction.

FIG. 5*a* shows the electric switch assembly of FIG. 4*b* from a direction oblique to the vertical, depth and width directions.

Figure 5B:
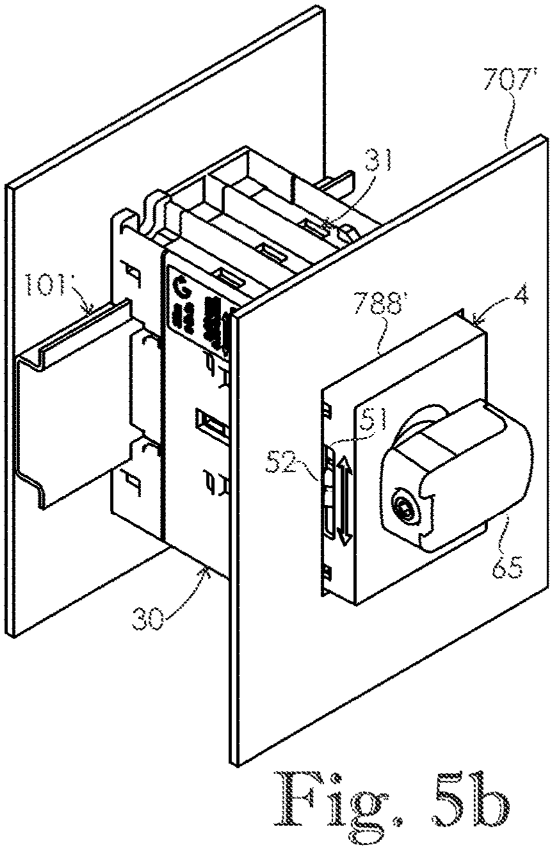
FIG. 5*b* shows the electric switch assembly of FIG. 5*a* with a protection plate.

FIG. 5*b* shows the electric switch assembly of FIG. 5*a* with the protection plate 707'. The protection plate 707' is parallel with the installation rail 101' and spaced apart from it in the depth direction. A portion of the adapter body 2 and a portion of the protective cover 4 extend through the protection plate opening 788' such that the operating handle 65 is located on a first side of the protection plate 707' while terminal members and terminals of the electric switch 30 are located on a second side of the protection plate 707'.

In the electric switch assembly of FIG. 5*b*, a portion of the protective cover 4 is located on the first side of the protection plate 707', and another portion of the protective cover 4 is located on the second side of the protection plate 707'. Since the dimension of the protective cover 4 in the height direction is 45 mm, edges of the protection plate opening 788' inherently prevent the protective cover 4 from moving away from the protection position.

It will be obvious to a person skilled in the art that the inventive concept can be implemented in various ways. The invention and its embodiments are not limited to the examples described above but may vary within the scope of the claims.

The invention claimed is:

1. An adapter for an electric switch assembly, the adapter comprising:

an adapter body adapted to be immovably connected to an electric switch including a first set of terminals, wherein each of the terminals is adapted to be electrically conductively connected to a corresponding electric wire, and includes a terminal member adapted for releasing a connection between the terminal and the corresponding electric wire, wherein the adapter includes a protective cover movably connected to the adapter body such that the protective cover has a protection position and a first installation position relative to the adapter body, wherein in the protection position the protective cover is adapted to prevent use of the terminal members of the electric switch, and in the first installation position the protective cover is adapted to enable use of terminal members of the first set of terminals, wherein said use of a terminal member includes releasing a connection between the terminal and the corresponding electric wire;

wherein the adapter body comprises a first set of apertures and a second set of apertures extending through the adapter body in a depth direction, wherein the first set of apertures and the second set of apertures are spaced apart in a height direction of the adapter body, and adapted to provide access to terminal members of the electric switch when the adapter body is in a connected state relative to the electric switch;

wherein in the protection position the protective cover covers at least a majority of cross-sectional areas of the first set of apertures and second set of apertures, and in the first installation position the protective cover covers less the cross-sectional area of the first set of apertures than in the protection position.

2. The adapter according to claim 1, wherein in the protection position the protective cover covers at least 75% of cross-sectional areas of the first set of apertures and second set of apertures, and in the first installation position the protective cover covers less than 10% of cross-sectional area of the first set of apertures.

3. The adapter according to claim 1, wherein the protective cover has a second installation position relative to the adapter body, wherein in the second installation position the protective cover covers less the cross-sectional area of the second set of apertures than in the protection position.

4. The adapter according to claim 1, wherein the adapter comprises an adapter handle member movably connected to the adapter body such that the adapter handle member has a first position and a second position relative to the adapter body, wherein the adapter handle member is movable relative to the protective cover, and wherein the adapter handle member is adapted to be connected to a control member of the electric switch in order to enable transferring the electric switch between a connected state and disconnected state thereof by moving the adapter handle member.

5. The adapter according to claim 4, wherein the adapter handle member is rotatably connected to the adapter body, and the adapter handle member is adapted to be connected to a control shaft of the electric switch in order to enable transferring the electric switch between a connected state and disconnected state thereof by rotating the adapter handle member.

6. The adapter according to claim 4, wherein the adapter handle member is adapted to be padlocked in the first position relative to the adapter body, wherein the first position of the adapter handle member corresponds to the disconnected state of the electric switch.

7. The adapter according to claim 1, wherein one of the protective cover and the adapter body includes at least one groove, and the other of the protective cover and the adapter body includes at least one protrusion adapted to cooperate with the at least one groove in order to enable movable connection between the protective cover and the adapter body while keeping the protective cover and the adapter body together.

8. The adapter according to claim 1, wherein the adapter body is adapted to be immovably connected to the electric switch by means of snap-fitting.

9. The adapter according to claim 8, wherein the adapter body is provided with a plurality of flexible snap-fit members adapted to cooperate with counterpart members provided on the electric switch.

10. The adapter according to claim 9, wherein the protection position and the first installation position are spaced apart in a height direction, and the plurality of flexible snap-fit members include a first snap-fit member on a first side of the adapter body, and a second snap-fit member on a second side of the adapter body, wherein the first side and the second side are spaced apart in the height direction.

11. An electric switch assembly comprising:

an adapter immovably connected to an electric switch including a first set of terminals, wherein each of the terminals is adapted to be electrically conductively connected to a corresponding electric wire, and includes a terminal member adapted for releasing a connection between the terminal and the corresponding electric wire, wherein the adapter includes a protective cover movably connected to an adapter body such that the protective cover has a protection position and a first installation position relative to the adapter body, wherein in the protection position the protective cover is adapted to prevent use of the terminal members of the electric switch, and in the first installation position the protective cover is adapted to enable use of terminal members of the first set of terminals, wherein said use of a terminal member includes releasing a connection between the terminal and the corresponding electric wire, and the electric switch adapted to be immovably connected to the adapter, wherein the electric switch comprises a first set of terminals and a second set of terminals, wherein the first set of terminals and the second set of terminals are spaced apart in a height direction of the electric switch, wherein each terminal of the first set of terminals and second set of terminals is adapted to be electrically conductively connected to a corresponding electric wire, wherein in the protection position the protective cover is adapted to prevent use of the terminal members of the electric switch, and in the first installation position the protective cover is adapted to enable use of the first set of terminal members, wherein the adapter comprises an adapter handle member movably connected to the adapter body such that the adapter handle member has a first position and a second position relative to the adapter body, wherein the adapter handle member is movable relative to the protective cover, and wherein the adapter handle member is adapted to be connected to a control member of the electric switch in order to enable transferring the electric switch between a connected state and disconnected state thereof by moving the adapter handle member.

12. The electric switch assembly according to claim 11, wherein in the protection position the protective cover is adapted to enable a voltage measurement from the first set of terminals and the second set of terminals through the adapter body.

13. The electric switch assembly according to claim 11, wherein the electric switch is adapted to be mounted on a standardized installation rail.

14. An adapter for an electric switch assembly, the adapter comprising:

an adapter body adapted to be immovably connected to an electric switch including a first set of terminals, wherein each of the terminals is adapted to be electrically conductively connected to a corresponding electric wire, and includes a terminal member adapted for releasing a connection between the terminal and the corresponding electric wire, wherein the adapter includes a protective cover movably connected to the adapter body such that the protective cover has a protection position and a first installation position relative to the adapter body, wherein in the protection position the protective cover is adapted to prevent use of the terminal members of the electric switch, and in the first installation position the protective cover is adapted to enable use of terminal members of the first set of terminals, wherein said use of a terminal member includes releasing a connection between the terminal and the corresponding electric wire;

wherein the adapter comprises an adapter handle member movably connected to the adapter body such that the adapter handle member has a first position and a second position relative to the adapter body, wherein the adapter handle member is movable relative to the protective cover, and wherein the adapter handle member is adapted to be connected to a control member of the electric switch in order to enable transferring the electric switch between a connected state and disconnected state thereof by moving the adapter handle member.

* * * * *